July 19, 1927.
W. E. COPITHORN
DEMOUNTABLE RIM
Original Filed Oct. 2, 1920   2 Sheets-Sheet 1
1,636,045
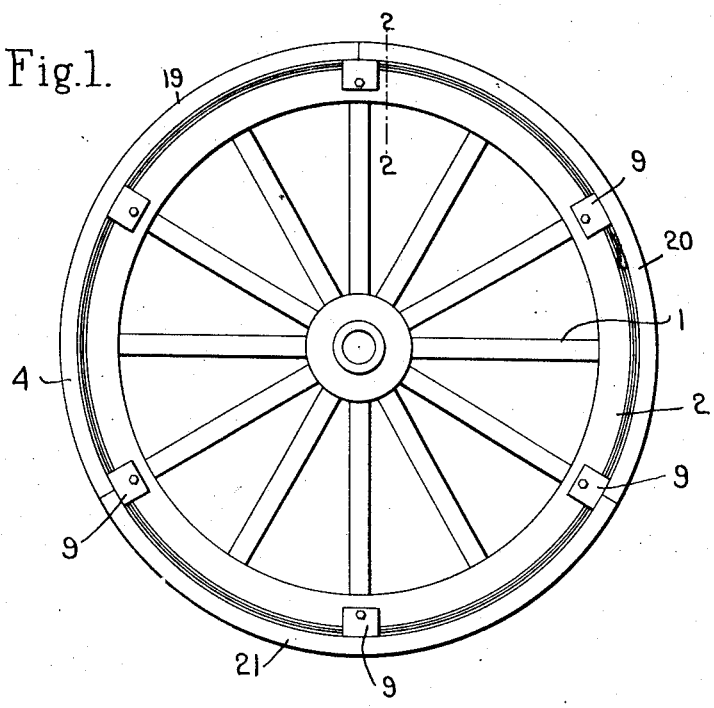
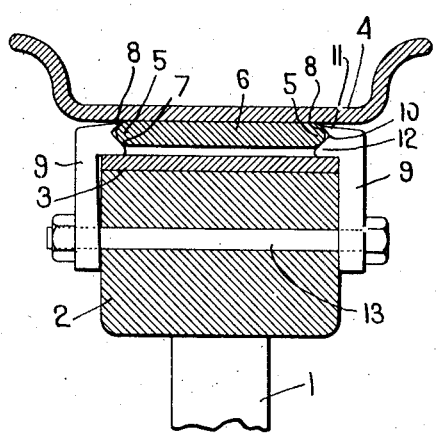 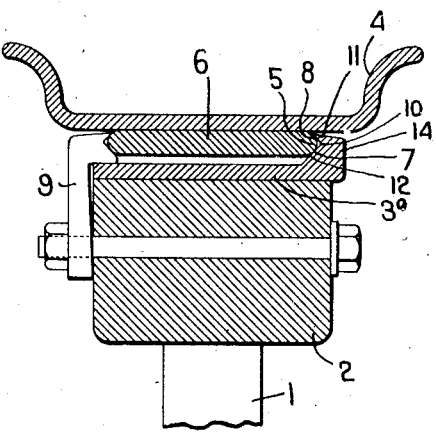
Inventor.
Walter E. Copithorn
by Heard Smith & Tennant.
Attys.

July 19, 1927.

W. E. COPITHORN 1,636,045

DEMOUNTABLE RIM

Original Filed Oct. 2, 1920   2 Sheets-Sheet 2

Inventor.
Walter E. Copithorn
by Heard Smith & Tennant
Attys.

Patented July 19, 1927.

1,636,045

UNITED STATES PATENT OFFICE.

WALTER E. COPITHORN, OF NATICK, MASSACHUSETTS.

DEMOUNTABLE RIM.

Application filed October 2, 1920, Serial No. 414,308. Renewed February 15, 1927.

This invention relates to demountable rims for automobile wheels and other vehicle wheels, and it has for its object to provide a demountable rim having novel means for locking the rim to the wheel. A demountable rim embodying my invention is provided on its inner face adjacent each edge with a rib having a rounded side face that is adapted to cooperate with clamping lugs or a clamping ring that is constructed to engage the underface of the rib, thereby holding the rim from inward radial movement, and also constructed to engage the outer face of the rib, thereby holding the rim from outward radial movement, and is further constructed to engage the felly-band of the wheel body and thus positively retain the rim in its proper position.

In order to give an understanding of my invention, I have illustrated in the drawings some selected embodiments thereof, which will now be described, after which the novel features will be pointed out in the appended claim.

Fig. 1 is a side view of an automobile wheel having my improved rim applied thereto;

Fig. 2 is an enlarged, sectional view on the line 2—2, Fig. 1;

Fig. 3 is a view similar to Fig. 2 showing a different embodiment of my invention;

Figure 4:
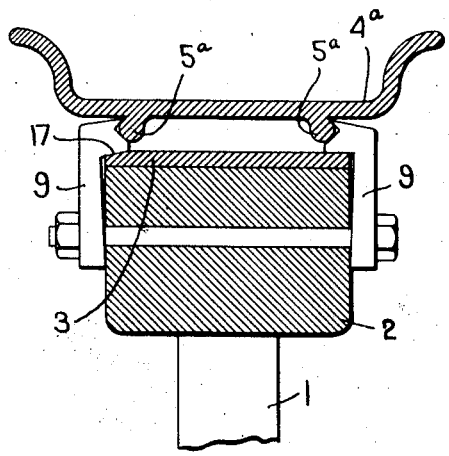
Fig. 4 is also a sectional view similar to Fig. 2 showing a still different embodiment of my invention.

My invention relates particularly to the manner of locking the demountable rim to the wheel body, and it is immaterial whether the demountable rim is a solid, unbroken rim or is a split rim, or is a sectional rim comprising two or more separable sections.

In the drawings 1 indicates generally a wheel body having the usual wooden felly 2, which is encircled by the metal felly-band 3. The demountable rim is indicated generally at 4, and so far as the invention is concerned, it may be of the clincher variety or of the so-called straight-side type.

The demountable rim is provided on its inner face and near each edge with a rib having a rounded face. In the construction shown in Figs. 2 and 3, these ribs are formed by the edges 5 of a band 6 of metal which is welded or otherwise secured to the inner face of the demountable rim 4. The edges of this band are rounded as shown in Figs. 2 and 3, and said rounded edges constitute the ribs with which the locking means cooperate to hold the demountable rim to the wheel.

Such locking means may be in the form of lugs or in the form of a ring. In either case the locking means is secured to the felly 2 and is constructed to engage the rib on the underside at the point 7, thereby holding the rib from inward radial movement, and also constructed to engage the rib at the point 8, thereby to hold the demountable rim from outward radial movement. Such locking means is also constructed to engage the outside of the felly-band 3, and by means of this three-point engagement the demountable rim will be firmly held in proper position.

In Fig. 1 the locking means is in the form of lugs 9 which are secured to the felly by clamping bolts. Lugs of this nature may be used on both sides of the demountable rim or on one side only as desired. In Fig. 2 I have shown lugs on both sides, and the lug is made with the V-shape notch 10 adapted to engage the rounded rib 5. The formation of this notch provides one arm or jaw 11 which is shaped to fit into the angle formed between the demountable rim and the rib 5, and to engage the side face of the rib at the point 8, and another jaw 12 shaped to enter between the rib and the felly-band, and to engage the rib at the point 7, and also to engage the felly-band. These lugs 9 are shown as secured to the felly by means of clamping bolts 13, and with this arrangement the lugs on either or both sides of the wheel can be removed as desired.

The jaw 11 of the lugs is constructed so that it is free from engagement with the body of the demountable rim 4, and only has engagement with the rib at the point 8. This manner of fastening the rim in place holds the latter against radial movement either inwardly or outwardly, and also securely holds it from lateral movement.

In Fig. 3 a construction is shown in which the jaws at one side of the wheel are made integral with the felly-band which is indicated at 3ᵃ. Where this construction is employed, the felly-band may have at one edge an annular flange or extension 14 provided on its inner face with the notch 10, thereby to provide the jaws 11 and 12. The jaws thus made will be continuous, but to embody my invention they will be made so as to engage the rib 5 at the points 8 and 7.

Figure 5:
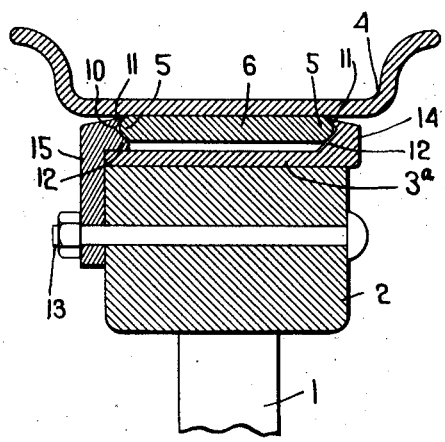
Fig. 5 is a sectional view similar to Fig. 2 showing a form of my invention which embodies a clamping ring instead of clamping lugs.
Figure 6:
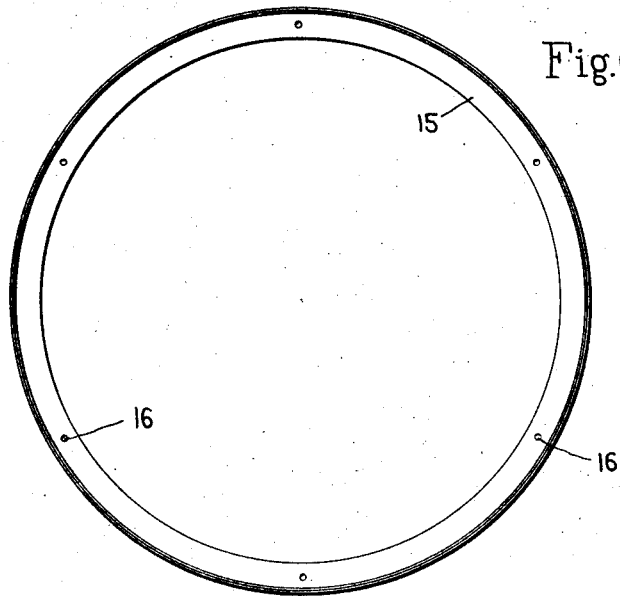
Fig. 6 is a side view of the clamping ring.

In Fig. 4 I have shown an embodiment of the invention wherein the ribs are made as integral parts of the demountable rim. Said rim is indicated at 4ᵃ and is provided on its inner face with the two separate ribs 5ᵃ. Each of the ribs 5ᵃ shown in Fig. 4 however, has the rounded side face which is embraced by the jaws 11, 12 of the lugs 9. It is also possible to embody my invention in a construction wherein the fastening means on each side of the wheel is in the form of a ring. Such a construction is shown in Figs. 5 and 6, wherein the felly-band 3ᵃ has formed at one edge as an integral part thereof, a flange 14 constructed to present the jaws 11 and 12 as shown in Fig. 3. On the other side of the wheel a locking ring 15 is employed which is also formed with the notch 10 and jaws 11 and 12. This ring 15 may be detachably secured to the wheel body in any suitable way, as for instance by means of the clamping bolts 13 which pass through apertures 16 in the ring 15.

As stated above, the demountable rim may be either a solid, unbroken rim, or a split rim, or a sectional rim. In Fig. 1 I have shown a demountable rim comprising the three separable sections 19, 20 and 21, and where either a sectional rim or a split rim is employed, I will arrange the rim so that the joint will come midway of one of the lugs 9. This is the construction shown in Fig. 1, wherein the joint between the meeting ends of any two adjacent sections is situated in line with one of the lugs 9. In this way the lug at the joint will embrace both meeting ends of two adjacent sections and thus hold said ends from radial movement in either direction.

In the above specification and in the claim, I have referred to the ribs as having rounded side faces. By this term I intend to cover any face of a bulging nature arranged so that the two inclined faces of the jaws 11 and 12 can engage the rib so as to apply both inward and outward radial pressure to the rib. It is not necessary that the side face of the rib should be a true curve so long as it is arranged to present a bulging contour suitable to be gripped by the jaws 11 and 12.

I claim:

In a wheel, the combination with a wheel body having a felly-band, of a demountable rim provided on its inner face adjacent each edge with a locking rib having a rounded side face, locking means on each side of the wheel body to co-operate with the corresponding rib, each locking means including a member having two jaws with inclined faces, the face of one jaw engaging its rib at a point outside the median line of the rib, the inclined face of the other jaw engaging the rib at another point inside its median line, said latter jaw of one member at least resting against the outer peripheral face of the felly-band, said member thereby having three points of engagement, two with the rib, and one with the felly-band.

In testimony whereof, I have signed my name to this specification.

Dr. WALTER EDWARD COPITHORN.